US009802398B2

(12) United States Patent
Rieck et al.

(10) Patent No.: US 9,802,398 B2
(45) Date of Patent: Oct. 31, 2017

(54) TRANSFER LAMINATION (71) Applicant: Assa Abloy AB, Stockholm (SE)

(72) Inventors: James Rieck, Brooklyn Park, MN (US); Joshua Nippoldt, Bloomington, MN (US); William Bergerson, Apple Valley, MN (US); Brent Lien, Minneapolis, MN (US)

(73) Assignee: Assa Abloy AB, Stockholm (SE)

( * ) Notice: Subject to any disclaimer, the term of this patent is extended or adjusted under 35 U.S.C. 154(b) by 410 days.

(21) Appl. No.: 14/417,654

(22) PCT Filed: Jul. 16, 2013

(86) PCT No.: PCT/US2013/050607
§ 371 (c)(1),
(2) Date: Jan. 27, 2015

(87) PCT Pub. No.: WO2014/022088
PCT Pub. Date: Feb. 6, 2014

(65) Prior Publication Data
US 2015/0217549 A1    Aug. 6, 2015

Related U.S. Application Data (60) Provisional application No. 61/677,653, filed on Jul. 31, 2012.

(51) Int. Cl.
*B32B 37/00* (2006.01)
*B32B 38/00* (2006.01)
(Continued)

(52) U.S. Cl.
CPC ............ *B32B 37/025* (2013.01); *B32B 38/10* (2013.01); *B41M 5/38207* (2013.01);
(Continued)

(58) Field of Classification Search
CPC ......... B32B 37/00; B32B 37/02; B32B 37/02; B32B 37/025; B32B 38/00; B32B 38/10;
(Continued)

(56) References Cited

U.S. PATENT DOCUMENTS 5,011,707 A    4/1991   Schell et al.
5,220,343 A    6/1993   Takanashi et al.
(Continued)

FOREIGN PATENT DOCUMENTS

| WO | 2008108904 A1 | 9/2008 | |
|---|---|---|---|
| WO | 2008118424 A1 | 10/2008 | |
| WO | 2011085174 A2 | 7/2011 | |
| WO | 2011085174 A3 | 7/2011 | |
| WO | WO 2011085174 A2 * | 7/2011 | ......... B32B 37/0046 |
| WO | 2014022088 A1 | 2/2014 | |

OTHER PUBLICATIONS

Communication pursuant to Rules 161(1) and 162 EPC for European Application No. 13740482.8, dated Apr. 24, 2015.
(Continued)

*Primary Examiner* — Jacob T Minskey
*Assistant Examiner* — Matthew Hoover
(74) *Attorney, Agent, or Firm* — Brian D. Kaul; Westerman, Champlin & Koehler, P.A.

(57) ABSTRACT

In a method of laminating a transfer layer to a substrate, a transfer layer is provided on a carrier layer. Portions of the transfer layer are selectively removed from the carrier layer using an adhesive panel by heating portions of the adhesive panel corresponding to the portions of the transfer layer, and transferring the portions of the transfer layer from the carrier layer to the adhesive panel. A transfer section of the transfer layer is then transferred from the carrier layer to a surface of the substrate by fracturing the transfer layer along an edge of the transfer section.

20 Claims, 5 Drawing Sheets (51) Int. Cl.
*B42D 25/00* (2014.01)
*B41M 5/00* (2006.01)
*B44C 1/00* (2006.01)
*B42D 25/21* (2014.01)
*B32B 38/10* (2006.01)
*B41M 5/382* (2006.01)
*B44C 1/17* (2006.01)
*B32B 37/06* (2006.01)
*B32B 37/12* (2006.01)
*B32B 37/22* (2006.01)

(52) U.S. Cl.
CPC ............... *B42D 25/21* (2014.10); *B44C 1/17* (2013.01); *B32B 37/06* (2013.01); *B32B 37/1207* (2013.01); *B32B 37/223* (2013.01); *B32B 2305/342* (2013.01); *B32B 2305/347* (2013.01); *B32B 2425/00* (2013.01); *B42D 25/00* (2014.10)

(58) Field of Classification Search
CPC ........ B42D 25/00; B42D 25/20; B42D 25/21; B41M 5/00; B41M 5/30; B41M 5/38; B41M 5/38; B41M 5/382; B41M 5/382; B41M 5/382; B41M 5/38207; B44C 1/00; B44C 1/10; B44C 1/17
See application file for complete search history.

(56) References Cited

U.S. PATENT DOCUMENTS

| | | | |
|---|---|---|---|
| 5,990,918 | A | 11/1999 | Baxendale |
| 6,264,296 | B1 | 7/2001 | Klinefelter et al. |
| 6,554,044 | B2 | 4/2003 | Paulson et al. |
| 6,803,936 | B2 | 10/2004 | Odaka et al. |
| 7,162,035 | B1 | 1/2007 | Durst et al. |
| 7,206,096 | B1 | 4/2007 | Sasaki et al. |
| 7,678,402 | B1 * | 3/2010 | Marino ............ A01K 15/026 119/709 |
| 2002/0101497 | A1 | 8/2002 | Kwasny et al. |
| 2005/0078998 | A1 | 4/2005 | Lien et al. |
| 2005/0269033 | A1 | 12/2005 | Kohira et al. |
| 2013/0032288 | A1 | 2/2013 | Lien et al. |

OTHER PUBLICATIONS

International Search Report and Written Opinion from PCT/US2013/050607, dated Nov. 4, 2013.
International Preliminary Report on Patentability Report and Written Opinion from PCT/US2011/020483, dated Jul. 19, 2012.
International Search Report and Written Opinion from PCT/US2011/020483, dated Jul. 22, 2011.

* cited by examiner

TRANSFER LAMINATION

CROSS-REFERENCE TO RELATED APPLICATION

This Application is a Section 371 National Stage Application of International Application No. PCT/US2013/050607, filed Jul. 16, 2013 and published as WO/2014/022088 A1 on Feb. 6, 2014, in English, which claims the benefit of U.S. Provisional Application Ser. No. 61/677,653 filed Jul. 31, 2012 under 35 U.S.C. §119(e), the contents of which are hereby incorporated by reference in their entirety.

BACKGROUND

Credentials include identification cards, driver's licenses, passports, and other documents. Such credentials are formed from credential or card substrates including paper substrates, plastic substrates, cards and other materials. Such credentials generally include printed information, such as a photo, account numbers, identification numbers, and other personal information. Credentials can also include data that is encoded in a smartcard chip, a magnetic stripe, or a barcode, for example.

Credential production devices process credential substrates by performing at least one processing step in forming a final credential product. One such process is a transfer or laminating process that transfers a material to a surface of the card substrate using a heated roller. This process can be used to transfer an image to the surface of the card substrate and/or provide protection to the surface of the card substrate from abrasion and environmental conditions, for example.

The material transferred to the surface of the card substrate using the heated roller is generally one of two types: a patch laminate, or a fracturable laminate or transfer layer often referred to as a "thin film laminate." The patch laminate is generally a pre-cut polyester film that has been coated with a thermal adhesive on one side. The pre-cut patch is removably attached to a continuous carrier layer which is generally a coated polyester material. The pre-cut patch is attached to the liner with the thermal adhesive side exposed and available for lamination to the substrate. The heated roller is used to heat the patch to activate the adhesive and press the patch to the surface of the substrate to bond the patch onto the surface.

One disadvantage to the use of a patch laminate is that it does not provide edge-to-edge protection to the surface of the card substrate because it must be formed slightly smaller than the surface of the card to ensure that the patch laminate does not extend beyond the card's edges. Another disadvantage to the use of the patch laminate appears when the surface of the card substrate requiring protection includes a feature over which the patch laminate should not be applied. Such features may include, for example, a magnetic stripe, a signature panel, a surface hologram feature, or electrical contacts of a smartcard module. In order to provide protection of graphics when these features are present, portions of the patch laminate must be removed prior to lamination to expose the feature. Further, it may be desirable to avoid heating some portions of the surface of the card substrate, something which is generally not possible using the heated roller.

Transfer layers are generally continuous resinous materials that have been coated onto a continuous carrier layer or backing to form a transfer ribbon. The side of the resin material that is not attached to the continuous carrier layer is generally coated with a thermal adhesive which is used to create a bond between the resin and the surface of the substrate. The heated roller is used to activate the adhesive and press the resinous material against the surface of the substrate to bond the material to the surface. The carrier layer or backing is removed to complete the lamination process.

The transfer layer may also be in the form of a print intermediate, on which an image may be printed in a reverse-image printing process. In the reverse-image printing process, an image is printed to the exposed side of the transfer layer. Next, the image on the transfer layer is registered with the card substrate. The heated roller is used to activate the adhesive on the imaged transfer layer causing the imaged transfer layer to bond to the surface of the card substrate. A backing of the overlaminate material is removed from the bonded imaged transfer layer to complete the transfer of the image to the card substrate.

The transfer layer provides a degree of protection to the surface of the substrate as well as the image printed on the transfer layer. Some transfer films include a protective layer that is configured to provide an additional level of protection to the surface and image. In general, the protective layer increases abrasion resistance, but can also provide protection from other environmental conditions, such as moisture, ultraviolet light, etc.

In most applications, the transfer ribbon is positioned to completely cover the surface of the substrate. Ideally, as the carrier layer is pulled from the portion of the transfer layer bonded to the surface of the substrate, the transfer layer fractures along the edges of the substrate. This results in the entire surface being covered by the transfer layer for full edge-to-edge protection of the surface. Unfortunately, the transfer layer does not always cleanly transfer to the substrate.

Edge flash occurs when the transfer film does not fracture properly along an edge of the substrate, such as the trailing edge, during the carrier peeling phase of the transfer lamination or reverse-image printing process. This results in portions of the transfer film remaining adhered to the carrier layer or the substrate that were respectively intended to bond to the substrate or the carrier layer, and defects in the processed substrate. Edge flash tends to be more problematic as the thickness of the transfer layer increases, such as due to a thick protective layer. As a result, the thickness of the transfer layer used in conventional transfer lamination processes and devices is limited to avoid edge flash issues. Unfortunately, this also limits the level of protection that may be provided to the surface of the substrate by the transfer layer.

Sometimes full edge-to-edge coverage of the surface of the substrate with the transfer layer is not desired. For instance, it may be necessary to avoid covering certain features that may be present on the surface of the substrate, such as, for example, a magnetic stripe, a signature panel, and other features mentioned above. One technique that is used to prevent the transference of the transfer layer to select portions of the card surface involves the use of an inhibitor panel of a print ribbon. The inhibitor panel is positioned over the imaged transfer layer of the transfer ribbon, and the print head selectively activates portions of the inhibitor panel corresponding to portions of the imaged transfer layer that should be prevented from being transferred to the surface of the substrate. The activation of the selective locations of the inhibitor panel cause those activated portions of the inhibitor panel to adhere to the corresponding portions of the imaged transfer layer through the activation of the adhesive in the transfer layer. As the print ribbon is pulled away from the imaged transfer ribbon, the activated portions of the inhibitor layer remove the corresponding imaged transfer layer portions from the transfer ribbon. The transfer ribbon then includes the remaining imaged transfer layer which was not removed through bonding with the inhibitor layer of the print ribbon. The gaps in the imaged transfer layer on the transfer ribbon that correspond to the removed sections of the imaged transfer adhesive correspond to the locations of the features of the substrate where the transference of the transfer layer is undesired. Accordingly, the sections of the substrate where the transference of the imaged transfer layer is undesired remain free of the transfer layer following the transference of the imaged transfer layer from the transfer ribbon to the surface of the substrate using the heated roller.

As with edge flash, the thickness and durability of the transfer layer also affects the success of the above-described transfer layer removal process. For instance, thick transfer layers are subject to tearing during the transfer layer removal process resulting in the undesired removal of non-activated portions of the transfer layer and/or the failure to remove activated portions of the transfer layer. This prevents the substrate from receiving the desired portions of the imaged transfer layer, resulting in defects.

SUMMARY

Embodiments of the invention are directed to a method of laminating a transfer layer to a substrate. In some embodiments of the method, a transfer layer is provided on a carrier layer. Portions of the transfer layer are selectively removed from the carrier layer using an adhesive panel by heating portions of the adhesive panel corresponding to the portions of the transfer layer, and transferring the portions of the transfer layer from the carrier layer to the adhesive panel. A transfer section of the transfer layer is then transferred from the carrier layer to a surface of the substrate by fracturing the transfer layer along an edge of the transfer section.

In some embodiments, transferring the transfer section includes aligning the transfer section with the surface of the substrate, laminating the transfer section to the surface of the substrate, and removing the carrier layer from the transfer section.

In some embodiments, the substrate is a card substrate.

In some embodiments, the substrate includes a leading edge, a trailing edge opposite the leading edge, and first and second opposing side edges extending between the leading and trailing edges. In some embodiments, the transfer section includes a leading edge corresponding to the leading edge of the substrate, a trailing edge corresponding to the trailing edge of the substrate, and side edges corresponding to the side edges of the substrate. Embodiments of the step of removing portions of the transfer layer include removing at least one portion of the transfer layer that adjoins one of the edges of the transfer section. In some embodiments, the portions of the transfer layer include first and second side zones of the transfer layer that respectively extend along the first and second side edges of the transfer section. In some embodiments, the fracturing of the transfer layer along an edge of the transfer section includes fracturing the transfer layer along the trailing edge of the transfer section.

In some embodiments, the selective removal of portions of the transfer section of the transfer layer include selectively removing aligned discrete portions of the transfer layer to create at least one perforation line in the transfer layer. In some embodiments, each discrete portion comprises a dot or a dash. In some embodiments, the transfer of the transfer section from the carrier layer to the surface of the substrate includes fracturing the transfer layer along one of the perforation lines. In some embodiments, the at least one perforation line is an edge line that adjoins one of the edges of the transfer section. In some embodiments, the edge line is aligned with one of the trailing edge, the leading edge or one of the side edges of the substrate.

In some embodiments, the selective removal of portions of the transfer layer includes selectively removing a line of the transfer layer. In some embodiments, the transfer layer and the carrier layer are fed in a feed direction during the selective removal of portions of the transfer layer. In some embodiments, the line is oriented at an angle of less than 45 degrees relative to the feed direction.

In some embodiments, the selective removal of portions of the transfer layer from the carrier layer includes selectively removing a pattern of the transfer layer. In some embodiments, the pattern is in the form of a perforated line, a cross-hatched pattern, a fishbone pattern and/or a dot pattern. In some embodiments, the pattern comprises a cross-hatched pattern having a plurality of lines, which are oriented at angles of less than 45 degrees to a feed direction in which the transfer layer and the carrier layer are fed during the selective removal of portions of the transfer layer.

In some embodiments, the selected removal of portions of the transfer layer from the carrier layer includes selectively removing portions of the transfer layer that are within the transfer section.

In accordance with another embodiment of the method, a transfer layer is provided on a carrier layer. At least one perforated line of the transfer layer is selectively removed from the carrier layer using an adhesive panel by heating portions of the adhesive panel corresponding to discrete portions of the transfer layer that form the perforated line, and transferring the discrete portions of the transfer layer from the carrier layer to the adhesive panel. A transfer section of the transfer layer is then transferred from the carrier layer to a surface of a substrate by fracturing the transfer layer along at least one of the perforated lines.

In some embodiments, the substrate includes a leading edge, a trailing edge opposite the leading edge, and opposing side edges extending between the leading and trailing edges. In some embodiments, the transfer section includes a leading edge corresponding to the leading edge of the substrate, a trailing edge corresponding to the trailing edge of the substrate, and side edges corresponding to the side edges of the substrate. In some embodiments, one of the perforated lines extends along one of the edges of the transfer section. In some embodiments, one of the perforated lines extends along the trailing edge of the transfer section.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will further be appreciated by one of skill in the art, the present invention may be embodied as methods, systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The invention is also described using flowchart illustrations and block diagrams. It will be understood that each block (of the flowcharts and block diagrams), and combinations of blocks, can be implemented by computer program instructions. These program instructions may be provided to a processor circuit, such as a microprocessor, microcontroller or other processor, such that the instructions which execute on the processor(s) create means for implementing the functions specified in the block or blocks. The computer program instructions may be executed by the processor(s) to cause a series of operational steps to be performed by the processor(s) to produce a computer implemented process such that the instructions which execute on the processor(s) provide steps for implementing the functions specified in the block or blocks.

Accordingly, the blocks support combinations of means for performing the specified functions, combinations of steps for performing the specified functions and program instruction means for performing the specified functions. It will also be understood that each block, and combinations of blocks, can be implemented by special purpose hardware-based systems which perform the specified functions or steps, or combinations of special purpose hardware and computer instructions.

Figure 1:
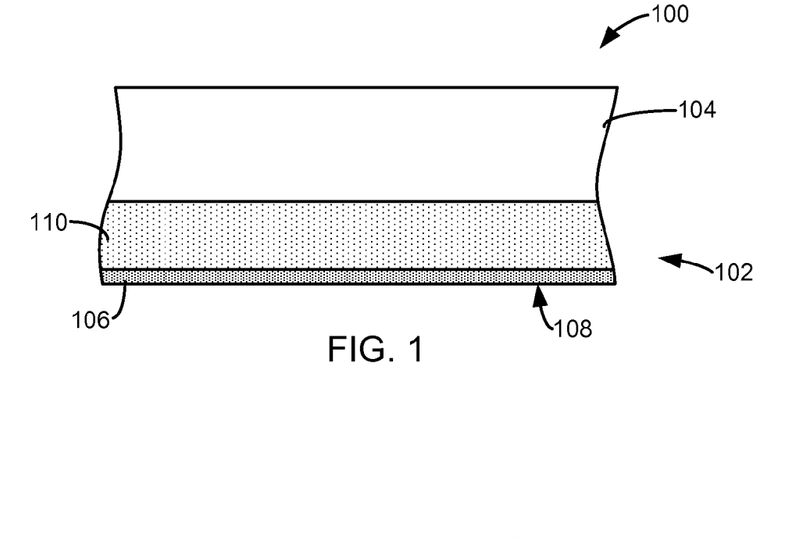
FIG. 1 is a simplified side cross-sectional view of an exemplary transfer ribbon in accordance with embodiments of the invention.

FIG. 1 is a simplified side cross-sectional view of an exemplary transfer ribbon 100 in accordance with embodiments of the invention. In some embodiments, the transfer ribbon 100 includes a transfer layer or film 102 that is attached to a backing or carrier layer 104. The transfer film 102 is configured to be transferred to a surface of a substrate through a transfer lamination process in accordance with embodiments of the invention.

In some embodiments, the transfer film 102 is in the form of a fracturable laminate or thin film laminate. In some embodiments, the transfer film 102 includes an image receptive layer 106 that is configured to receive an image on the surface 108. The image may be printed to the surface 108 in accordance with conventional techniques, such as through dye sublimation or inkjet printing processes.

The transfer ribbon 100 may include other conventional layers or materials that are not shown in order to simplify the illustration. These include a thermal adhesive in the image receptive layer 106, or a thermal adhesive layer on the image receptive layer 106. The thermal adhesive is activated during a transfer lamination process to bond the transfer film 102 to a substrate. The transfer ribbon 100 may also include a release layer between the transfer film 102 and the carrier layer 104 that simplifies the release of the transfer film 102 from the carrier layer 104 during the transfer lamination process. Other conventional materials or layers may also be included in the transfer ribbon 100.

In some embodiments, the transfer film 102 includes a protective layer 110 located between the image receptive layer 106 and the carrier layer 104. Alternatively, the protective layer 110 may be combined with the image receptive layer. The protective layer 110 operates to provide protection to the surface on which the transfer film 102 is laminated. The protective layer 110 will also protect an image printed on or in the image receptive layer 106 when the transfer film 102 is laminated to the surface of a substrate.

In some embodiments, the protective layer 110 is a highly durable protective layer that is capable of withstanding 1500 taber cycles. In some embodiments, the protective layer 110 is capable of withstanding 2000-3000+ taber cycles. In some embodiments, the protective layer 110 includes one or more resins. In some embodiments, the protective layer 110 has a thickness in the range of 12-40 µm. In some embodiments, the protective layer 110 has a thickness of greater than 25 µm. However, embodiments of the transfer lamination process described herein may be used with transfer layers 102 having protective layers 110 comprising other resins and having a thickness that lies outside the exemplary range provided above.

Figure 2:
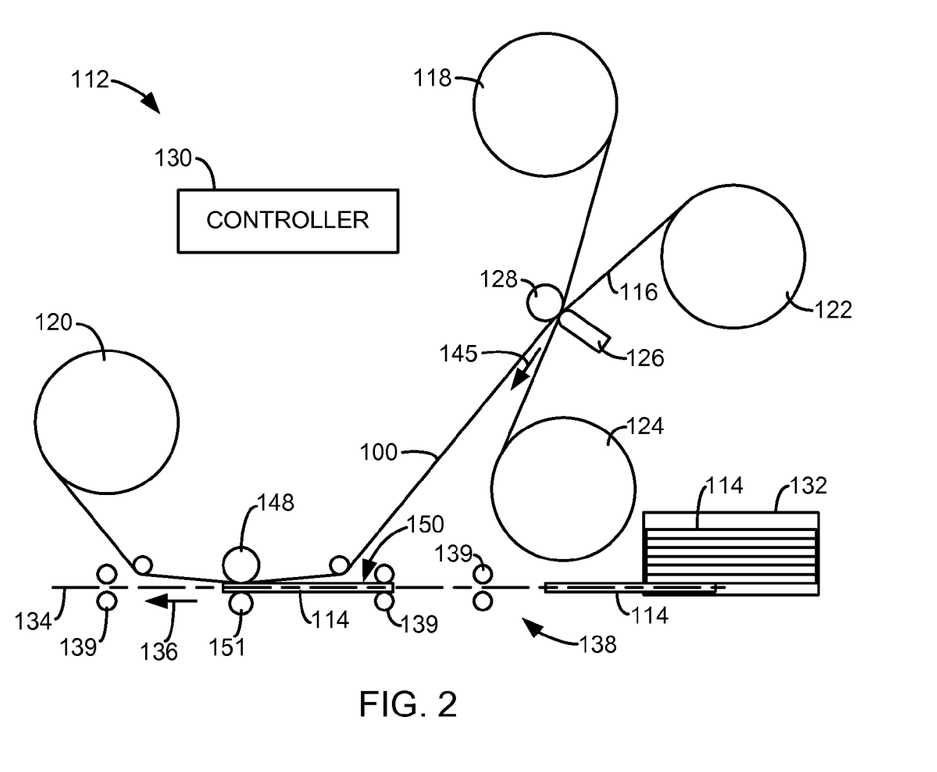
FIG. 2 is a simplified side view of an exemplary transfer lamination device in accordance with embodiments of the invention.

FIG. 2 is a simplified side view of an exemplary transfer lamination device 112 in accordance with embodiments of the invention. In some embodiments, the device 112 is in the form of a credential manufacturing device configured to produce credentials, such as driver's licenses, by processing a credential substrate 114 using the methods described herein. Motors, gears, circuitry and other conventional components are not depicted in FIG. 2 in order to simplify the illustration.

The substrate 114 may take on many different forms, as understood by those skilled in the art. In some embodiments, the substrate 114 is a credential substrate. As used herein, the term "credential substrate" includes substrates used to form credentials, such as identification cards, membership cards, proximity cards, driver's licenses, passports, credit and debit cards, and other credentials or similar products. Exemplary card substrates include paper substrates other than traditional paper sheets used in copiers or paper sheet printers, plastic substrates, rigged and semi-rigged card substrates and other similar substrates.

Embodiments of the device 112 include the transfer ribbon 100 and a print ribbon 116. In some embodiments, the print ribbon 100 is supported between a supply spool 118 and a take up spool 120, and the print ribbon 116 is supported between a supply spool 122 and a take up spool 124. Motors may be used to drive the supply and take up spools and feed the print and transfer ribbons as necessary, in accordance with conventional techniques.

In some embodiments, the device 112 includes a print head 126 and a print platen 128. The print head 126 is a conventional thermal print head comprising a plurality of heating elements 142 that may be individually activated. The print head 126 is configured to press the print ribbon 116 against the transfer ribbon 100 under the support of the print platen 128.

In some embodiments, the print ribbon 116 comprises a plurality of conventional print panels, such as colored dye panels, black resin panels, and/or other conventional print panels. Thus, the device 112 may be used to print an image to the surface 108 of the transfer layer 102 using the print ribbon 116 and the print head 126. The transfer layer can then be laminated to the substrate 114 as described below to complete a reverse-image printing process.

In some embodiments, the device 112 includes a controller 130 which represents at least one processor and memory. The controller 130 uses the processor to execute program instructions stored in the memory of the controller 130 or other location, to control components of the device 112 using conventional techniques, and perform functions and method steps described herein.

In some embodiments, the device 112 includes a substrate supply 132 (e.g., hopper, or cartridge) containing a plurality of the substrates 114. In some embodiments, the controller 130 controls the feeding of individual substrates 114 from the supply 132 along a processing path 134 in a feed direction 136 through the control of a conventional motorized transport mechanism 138. Embodiments of the transport mechanism 138 include motorized feed rollers or pinch roller pairs 139, or other conventional components.

Figure 3:
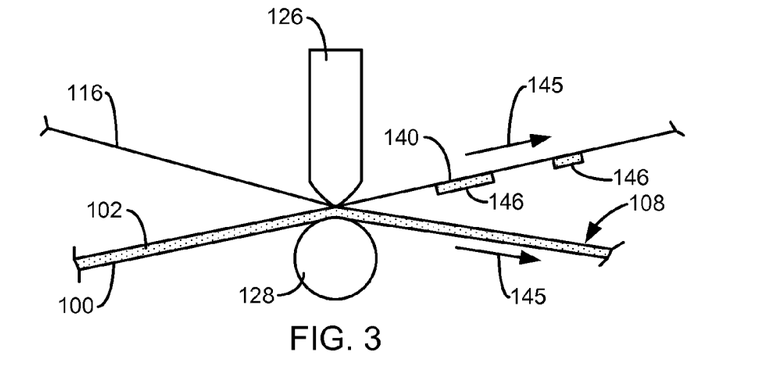
FIGS. 3 and 4 respectively are simplified side and front views of a printing section of the device of FIG. 2.

In some embodiments, the print ribbon 116 comprises a plurality of conventional colored dye panels, a black resin panel, and/or other conventional thermal print ribbon panels. In some embodiments, the print ribbon 116 includes an adhesive panel 140, shown in the simplified side view of the printing section of the device 112 provided in FIG. 3, which may be used to remove select portions of the transfer layer 102 from the carrier layer 104. In general, the print head 126 selectively activates the resistive heating elements 142 (shaded boxes), shown in the simplified front view of the printing section of the device 112 provided in FIG. 4, to thermally activate portions 144 (shaded areas) of the adhesive panel 140 as the adhesive panel 140 and the transfer ribbon 100 are fed past the print head 126 in a feed direction 145 (FIG. 3). The thermally activated portions 144 of the adhesive panel correspond to the desired portions of the transfer layer 102 that should not be transferred to the substrate 114 during the subsequent transfer lamination process.

The activated portions 144 of the adhesive panel bond to the corresponding portions of the transfer layer 102. As the print ribbon 116 is pulled away from the transfer ribbon 100, the bonded portions of the adhesive panel 140 remove the corresponding portions 146 of the transfer layer 102 from the carrier layer 104, as shown in FIG. 3. It is understood that the device 112 may include a roller, located downstream of the print head 126 relative to the feed direction 145, that controls the location where the adhesive panel 140 is peeled from the transfer ribbon 100.

Figure 5:
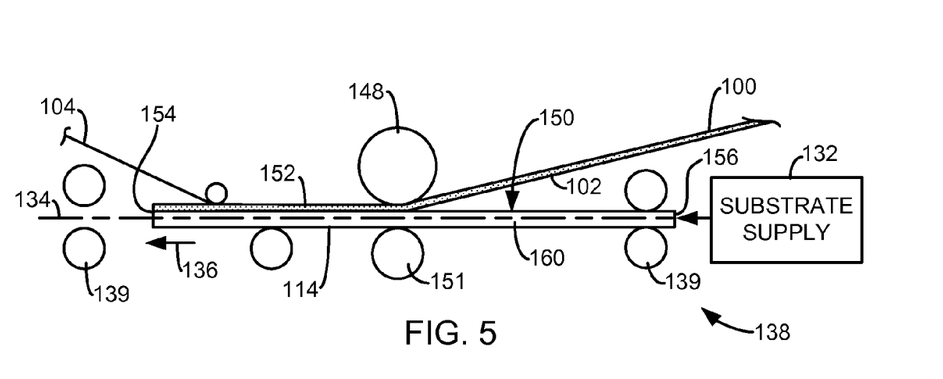
FIG. 5 is a simplified side view of a laminating section of the device of FIG. 2.

In some embodiments, the device 112 includes a heated laminating roller 148 that is configured to press the transfer ribbon 100 against a surface 150 of a credential substrate 114 supported on a platen 151, as shown in the side view of the laminating section provided in FIG. 5. The laminating roller 148 heats the transfer ribbon 100 including the adhesive of the transfer layer 102 to bond the remaining transfer layer 102 to the surface 150 of the substrate 114 in accordance with conventional techniques.

The device 112 may use the adhesive panel 140 to remove portions of the transfer layer 102 from the transfer ribbon 100 corresponding to locations on the surface 150 of the substrate 114 that should remain free of the transfer layer 102. Thus, the device 112 can avoid laminating the transfer layer 102 over features on the surface 150 of substrate 114, such as electrical contacts, a magnetic stripe, a signature line, or other features on the surface 150 of the substrate 114.

Figure 6:
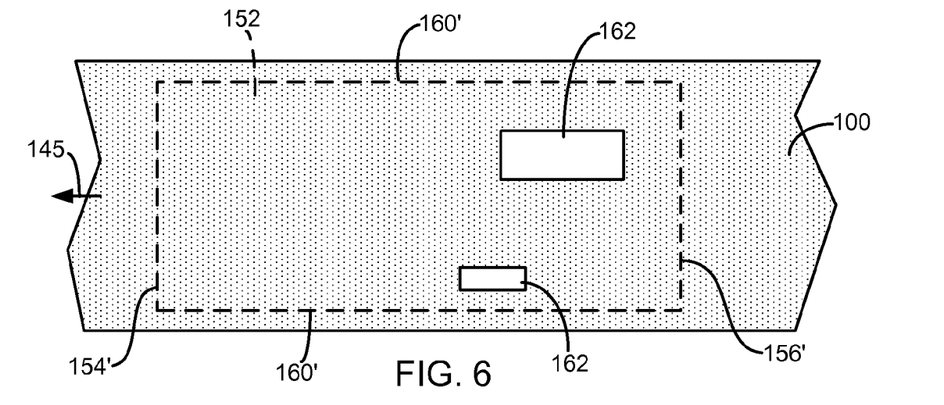
FIG. 6 is a simplified top view of a transfer ribbon in accordance with embodiments of the invention.

A transfer section 152 of the transfer layer 102, shown in the simplified top view of FIG. 6, corresponds to the surface 150 of the substrate 114. Generally, it is desirable to cover the entire surface 150 of the substrate 114 with the transfer layer 102, particularly when the transfer layer 102 is configured to provide protection to the surface 150 or an image printed to the surface 108 of the transfer layer 102. Thus, in some embodiments, the transfer section 152 substantially matches the surface 150 of the substrate 114 to which it is to be laminated.

For instance, when the substrate 114 is in the form of a card substrate, the card substrate includes a leading edge 154 and a trailing edge 156 based on the feed direction 136, in which the substrate 114 is fed along the processing path 134, as shown in FIG. 5. The substrate 114 also includes opposing side edges 160 extending between the leading and trailing edges 154 and 156. Accordingly, in some embodiments, the transfer section 152 includes a leading edge 154' corresponding to the leading edge 154 of the substrate 114, a trailing edge 156' corresponding to the trailing edge 156 of the substrate 114, and opposing side edges 160' corresponding to the side edges 160 of the substrate 114, as shown in FIG. 6.

In some embodiments, the transfer section 152 includes transfer layer gaps 162 where portions 146 of the transfer layer 102 have been removed using the adhesive panel 140 of the print ribbon 116. These gaps 162 may correspond to features on the surface 150 of the substrate 114, as discussed above.

Figure 7:
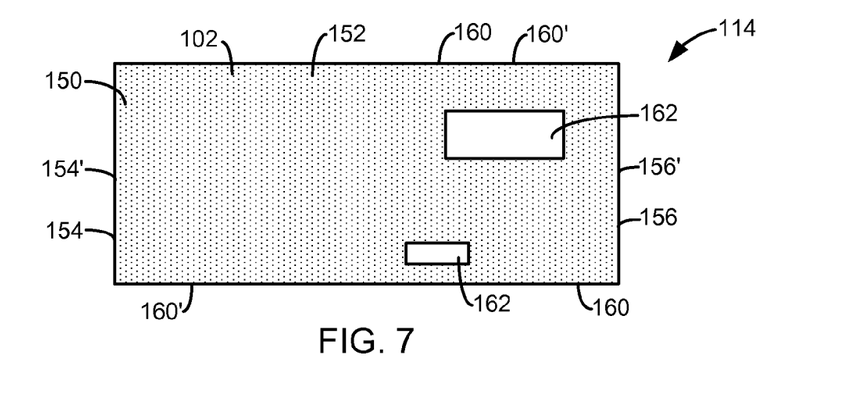
FIG. 7 is a simplified top plan view of a processed substrate in accordance with embodiments of the invention.

Following the lamination of the transfer section 152 to the surface 150 of the substrate 114 using the laminating roller 148, the processed card substrate 114 includes the transfer section 152 of the transfer layer 102 on the surface 150, as shown in FIG. 7. Thus, in some embodiments, the entire surface 150 of the substrate 114 is covered by the transfer layer 102, except for the gaps 162 in the transfer layer 102 where features of the card substrate 114 may be located. The processed card substrate 114 may then be discharged from the device 112 into a hopper, or fed to another processing component of the device 112 (e.g., substrate rotator, data encoder, etc.), for example.

For some configurations of the transfer layer 102, it may not be possible to cleanly remove desired sections of the transfer layer 102 from the backing 114 using the adhesive panel. In general, the more durable the protective layer feature of the transfer layer 102, such as due to the type of resin used, thickness or other characteristic, the less likely desired sections of the transfer layer 102 may be cleanly removed from the carrier layer 104 using the adhesive panel 140.

Figure 8:
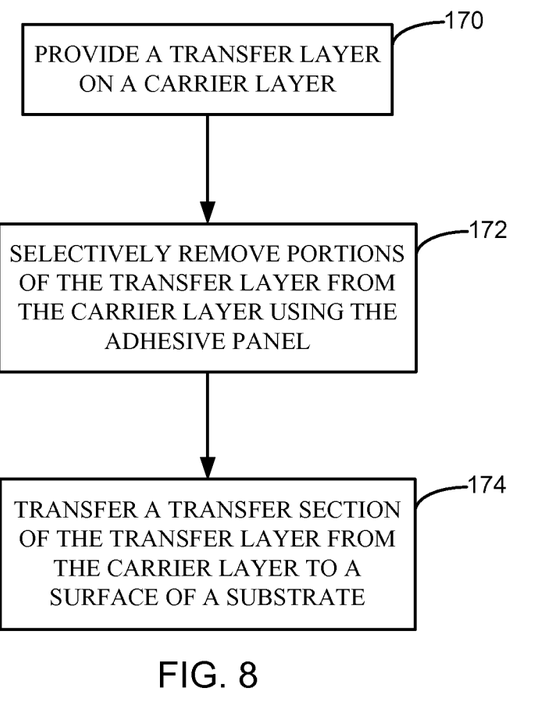
FIG. 8 is a flowchart illustrating a method in accordance with embodiments of the invention.

FIG. 8 is a flowchart illustrating a method in accordance with embodiments of the invention that can be used to remove portions 146 from various forms of the transfer layer 102, including highly durable forms. In some embodiments, a transfer layer 102, which is formed in accordance with one or more embodiments described above, is provided on a carrier layer 104, at 170.

Figure 4:
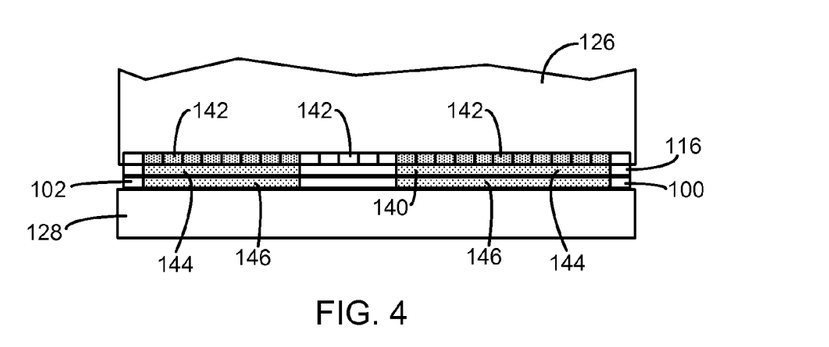

At 172, portions 146 of the transfer layer 102 are selectively removed from the carrier layer 104 using the adhesive panel 140, in accordance with one or more embodiments of the techniques described above. In some embodiments of step 172, portions 144 of the adhesive panel 140 corresponding to the portions 146 are heated using, for example, the heating elements 142 of the print head 126, as shown in FIG. 4. The portions 146 of the transfer layer 102 are then bonded to the adhesive panel 140 and removed from the carrier layer 104, as shown in FIG. 3. In some embodiments, the adhesive panel 140 is a panel of a print ribbon 116, which is placed between the print head 126 and the print platen 128 along with the transfer ribbon 100, as shown in FIG. 3.

At 174 of the method, the transfer section 152 of the transfer layer 102 is transferred from the carrier layer 104 to a surface 150 of the substrate 114, as shown in FIG. 5. In some embodiments, the transfer section 152 is aligned with the surface 150 of the substrate 114. This is generally accomplished in accordance with conventional techniques. For instance, sensors may be used to detect the leading edges 154 and 154' of the substrate 114 and the transfer section 152. Motors driving the transport mechanism 138 and the feeding of the transfer ribbon 100 are used to adjust the relative positions of the transfer section 152 and the substrate 114, such that the leading edges 154 and 154' are aligned at the laminating roller 151. In some embodiments, step 174 utilizes a heating laminating roller 151 to bond the transfer section 152 to the surface 150, followed by the removal of the carrier layer 104 from the transfer section 152, as generally illustrated in FIG. 5. This leaves the transfer section bonded to the surface 150 of the substrate 114. The processed card substrate 114 may then be passed to another stage of the device 112 for further processing (rotating, data encoding, etc.), or discharged into a hopper.

Occasionally, the transfer section 152 may fail to cleanly fracture from the surrounding portions of the transfer layer 102 that are to remain attached to the carrier layer 104 as the carrier layer 104 is pulled from the transfer section 152 (FIG. 5). For instance, the trailing edge 156' of the transfer section 152 and its associated corners may not cleanly fracture during the transfer lamination step 174. Additionally, the portions 146 may occasionally fail to cleanly fracture from the surrounding portions of the transfer layer 102 that are to remain attached to the carrier layer 104, as the transfer ribbon 100 is pulled from the adhesive panel 140 (FIG. 3). Such problems are more likely to occur when the transfer layer 102 is in a highly durable form.

Figure 9:
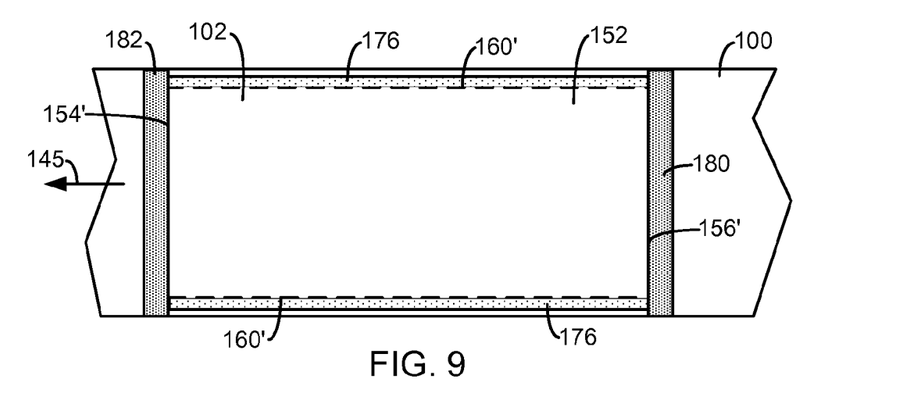
FIGS. 9 and 10 are top views of a transfer ribbon illustrating a transfer layer removal process in accordance with embodiments of the invention.

In some embodiments, the transfer layer 102 includes side portions or zones 176 extending outside the side edges 160' of the transfer section 152, as illustrated in FIG. 9. It has been discovered that the removal of the side portions 176 of the transfer layer 102 results in a more clean fracture of the transfer layer 102 at the trailing edge 156' boundary of the transfer section 152, even when the transfer layer 102 is of a highly durable form.

In some embodiments of step 172, the side portions 176 of the transfer layer 102 are removed using the adhesive panel 140. Thus, portions 144 of the adhesive panel 140 corresponding to the side portions 176 of the transfer layer 102 are heated and activated using the heating elements 142 of the print head 126. The side portions 176 bond to the activated side portions 144 of the adhesive panel, and are transferred to the adhesive panel 140 from the carrier layer 104, as discussed above.

It has been discovered that the side portions 176, which are aligned with the feed or processing direction 145 in which the transfer ribbon 100 and the print ribbon 116 are fed past the print head 126, can be cleanly removed using this technique even when the transfer layer 102 is in a highly durable form. That is, the removal of the side portions 176 does not generally result in the removal of portions of the transfer layer 102 that do not correspond to the heated portions 144 of the adhesive panel 140.

In some embodiments, the transfer layer 102 includes a trailing portion or zone 180 that adjoins the trailing edge 156' of the transfer section 152, as illustrated in FIG. 9. In some embodiments of step 172, the trailing portion 180 of the transfer layer 102 is removed using the adhesive panel 140 prior to the transfer lamination process of step 174.

In some embodiments, the transfer layer 102 includes a leading portion or zone 182 that adjoins the leading edge 154' of the transfer section 152, as illustrated in FIG. 9. In some embodiments of step 172 of the method, the leading portion 182 is removed from the carrier layer 104 using the adhesive panel 140 prior to the lamination step 174.

The successful transfer of the portions 146 of the transfer layer 102 to the adhesive panel 140 in step 172 generally requires that the transferred portions 146 are substantially the same size as the corresponding activated portions 144 of the adhesive panel 140. That is, the transferred portions 146 are defined by boundaries that substantially match the boundaries of the activated portions 144 of the adhesive panel 140.

Occasionally, the transfer layer 102 fails to properly fracture at the boundary defined by the activated portions 144 of the adhesive panel 140, causing edge flash and tearing of the transfer layer 102. This may result in more or less of the transfer layer 102 being transferred to the adhesive panel 140 in step 172 than desired. Typically, this problem presents itself at the trailing edges of the portions 146 relative to the feed direction 145. This problem occurs more frequently when the trailing edge of a portion 146 has an angle relative to one of the side edges 160' of the transfer section 152, or the feed or processing direction 145, that is greater than a critical angle of approximately 30-45 degrees. In some embodiments, the critical angle is greater than 45 degrees.

Figure 10:
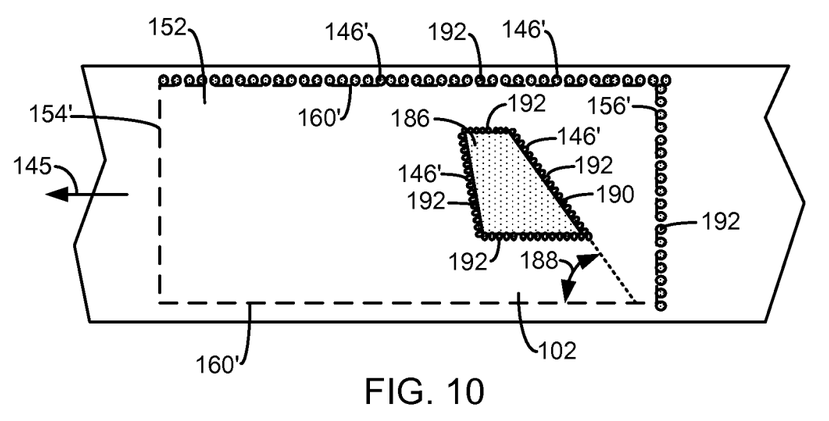

FIG. 10 is a simplified top view of the transfer ribbon 100, which illustrates removal of portions of the transfer layer 102 in accordance with embodiments of the invention. The removal of a section 186 of the transfer layer 102 can be problematic, particularly for durable transfer layers 102, due to the large angle 188 of the trailing edge 190, which is defined by the trailing edge boundary of the activated portions 144 of the adhesive panel 140. When the angle 188 of the trailing edge 190 is sufficiently small, such as less than 45 degrees, it is likely that the transfer layer 102 will fracture along the trailing edge 190 allowing the section 186 to be cleanly removed from the carrier layer 104 and the remainder of the transfer layer 102 and adhered to the adhesive panel 140 in step 172. However, when the angle 188 exceeds a critical angle, such as 45 degrees, the transfer layer 102 downstream of the trailing edge 190 relative to the feed direction 145 may tear as the transfer ribbon 100 is pulled from the adhesive panel 140 (FIG. 3) resulting in the undesired removal of portions of the transfer layer 102 that lay outside the boundaries established by the activated portions 144 of the adhesive panel 140. This results in the formation of a defective credential product (i.e., laminated substrate 114) following the transfer lamination step 174. This tearing issue also occurs when the section 186 of the transfer layer 102 to be removed is in the form of a line at an angle 188 relative to the side edge 160' of the transfer section 152 that exceeds a critical angle.

In some embodiments of step 172 of the method, the removal of the portions 146 of the transfer layer 102 using the adhesive panel 140 includes the removal of discrete portions 146' to form a perforated line 192 in the transfer layer 102. In some embodiments, the purpose of the perforated line 192 is to promote the fracturing of the transfer layer 102 along the perforated line 192. For instance, in some embodiments, a perforated line 192 is formed along the trailing edge 190 of the section 186 of the transfer layer 102 that is to be removed in step 172 to prevent or reduce the likelihood of an improper fracture of the transfer layer 102 along the trailing edge 190, particularly when the angle 188 exceeds the critical angle.

Figure 11:
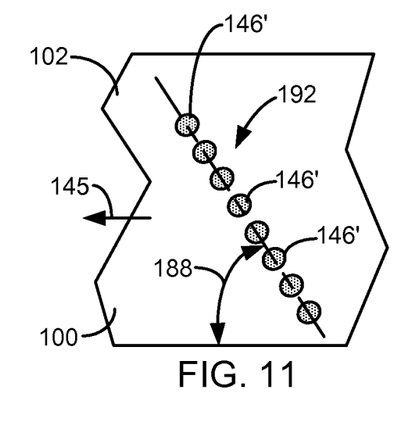
FIGS. 11 and 12 are simplified top views of a transfer ribbon having perforated lines of removed transfer layer portions in accordance with embodiments of the invention.
Figure 12:
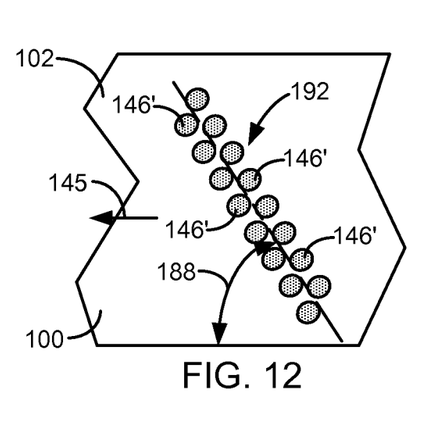

In some embodiments, the discrete portions 146' of the transfer layer 102 that form the perforated line 192 are in the form of small dots or dashes, as best shown in FIG. 11. In some embodiments, the discrete portions 146' of the perforated line 192 have a diameter within the range of 0.25-1.0 mm. In some embodiments, the discrete portions 146' have a length oriented with the trailing edge 190 in the range of 0.25-1.0 mm and a width in the range of 0.25-0.5 mm. In some embodiments, the discrete portions 146 of the perforated line 192 are separated by a section of the transfer layer 102 having a length in the range of 0.25-1.0 mm. In accordance with another embodiment, the perforated line 192 comprises staggered rows of the discrete portions 146', as shown in FIG. 12.

The perforated line 192 may also be used to remove portions of the side portions 176 adjacent or on the side edges 160' of the transfer section 152, as shown in FIG. 10. The perforated lines 192 may also be used adjacent to or on the trailing edge 156' of the transfer section 152, as shown in FIG. 10. Likewise, the perforated line 192 may be used along the leading edge 154' of the transfer section 152.

The transfer lines 192 may also be used along other edges of the portions of the transfer layer 102 to be removed from the transfer section 152. For instance, the perforated line 192 may be used along leading and side edges of the portion 186 of the transfer layer 102 that is to be removed from the transfer section 152, as shown in FIG. 10.

Figure 13:
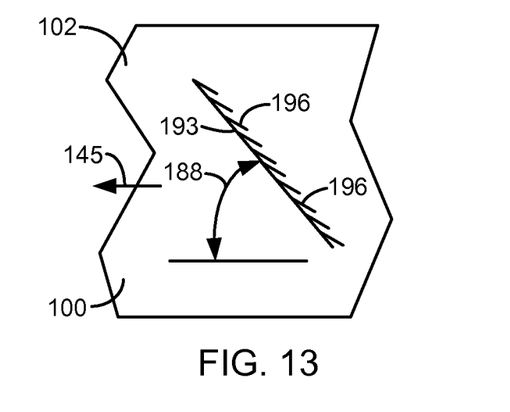
FIGS. 13 and 14 are simplified top views of a transfer ribbon illustrating embodiments of the invention.

As mentioned above, it can be difficult to remove a line 193 of the transfer layer 102, an example of which is shown in the simplified top view of the transfer ribbon 100 provided in FIG. 13, that is angled at or above the critical angle 188 (typically 45 degrees or greater) to the feed direction 145 without tearing the transfer layer 102 as the adhesive panel 140 is peeled from the transfer ribbon 100. In some embodiments of step 172, in addition to heating the portions of the adhesive panel 140 corresponding to the line 193 of the transfer layer 102, portions of the adhesive panel 140 corresponding to a series of short lines 196 of the transfer layer 102 are also heated using the print head 126. This causes the transfer of portions 146 of the transfer layer 102 forming the short lines 196 and the line 193 to transfer from the transfer layer 102 to the adhesive panel 140 as the carrier layer 104 is separated from the print ribbon 116 (FIG. 3).

The combination of the line 193 and the lines 196 form a pattern of the transfer layer 102 referred to herein as a "fishbone pattern." In some embodiments, the short lines 196 extend from a trailing edge side of the line 193 and are oriented at an angle relative to the side edge 160' or the feed direction 145 that is less than the critical angle where transfer layer tearing problems occur. Thus, in some embodiments, the short lines 196 are at an angle of less than 45 degrees relative to the feed direction 145.

Figure 14:
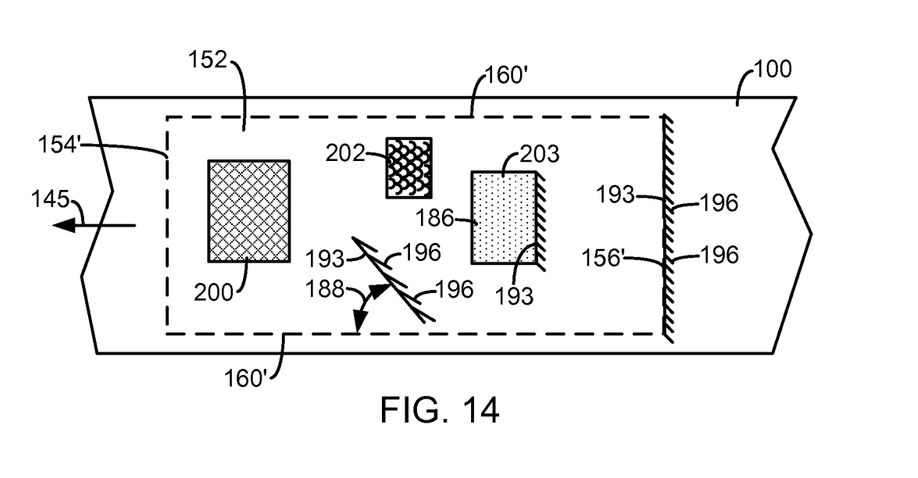

In some embodiments, the fishbone pattern of the removed portions 146 of the transfer layer 102 is formed at a boundary of the transfer section 152 using the lines 196, such as at the trailing edge 156', as shown in FIG. 14.

Likewise, in some embodiments, the fishbone pattern of the removed portions 146 of the transfer layer 102 is formed using the lines 196 at the trailing side of a section 186 of transfer layer 102 that is to be removed from within the transfer section 152, as shown in FIG. 14. In both instances, the short lines 196 prevent significant tearing of the transfer layer 102 beyond the trailing edge line 193.

For instance, tearing of the transfer layer 102 may occur at the line 193 due to the angle of the line 193 relative to the feed direction 145 matching or exceeding a critical angle for the transfer layer 102. However, the tearing of the transfer layer 102 from the line 193 will quickly encounter one of the short lines 196 as the carrier layer 104 is peeled from the transfer section 152 (FIG. 3). This stops the tear at the short line 196 and prevents further tearing of the transfer layer 102. As a result, large tears of the transfer layer 102 from the lines 193 may be avoided due to the short lines 196.

In some embodiments of step 172 of the method, the adhesive panel 140 is used to remove a pattern of the transfer layer 102 along edges of the transfer section 152, along edges of portions 186 of the transfer layer 102 that is to be removed from within the transfer section 152, and within the portions 186 within the transfer section 152. This assists in preventing tearing of the transfer layer 102 during the peeling of the transfer ribbon 100 from the adhesive panel 140 (FIG. 3) and/or during the removal of the carrier layer 104 from the transfer section 152 during the lamination process (FIG. 5). In some embodiments, the pattern comprises crisscrossed lines, as shown within the portion 200 of FIG. 14. In accordance with another embodiment, the pattern comprises a fish scale pattern, as shown in portion 202 in FIG. 14. In accordance with another embodiment, the pattern comprises a series of dots, as shown in portion 203 of FIG. 14.

Although the present invention has been described with reference to preferred embodiments, workers skilled in the art will recognize that changes may be made in form and detail without departing from the spirit and scope of the invention.

COPYRIGHT AND LEGAL NOTICES

A portion of the disclosure of this patent document contains material which is subject to U.S. copyright protection. The copyright owner has no objection to the facsimile reproduction by anyone of the patent document or the patent disclosure, as it appears in the United States Patent and Trademark Office patent files or records, but otherwise reserves all copyrights whatsoever.

What is claimed is:

1. A method of laminating a transfer layer to a substrate comprising:
providing a transfer layer on a carrier layer;
selectively removing portions of the transfer layer from the carrier layer using an adhesive panel comprising:
heating portions of the adhesive panel corresponding to the portions of the transfer layer; and
transferring the portions of the transfer layer from the carrier layer to the adhesive panel; and
transferring a transfer section of the transfer layer from the carrier layer to a surface of a substrate comprising fracturing the transfer layer along an edge of the transfer section.

2. The method according to claim 1, wherein transferring a transfer section comprises:
aligning the transfer section with the surface of the substrate;
laminating the transfer section to the surface of the substrate; and
removing the carrier layer from the transfer section.

3. The method according to claim 1, wherein the substrate is a card substrate.

4. The method according to claim 1, wherein:
the substrate includes a leading edge, a trailing edge opposite the leading edge, and first and second opposing side edges extending between the leading and trailing edges; and
the transfer section includes a leading edge corresponding to the leading edge of the substrate, a trailing edge corresponding to the trailing edge of the substrate and side edges corresponding to the side edges of the substrate; and
selectively removing portions of the transfer layer comprises removing at least one portion of the transfer layer that adjoins one of the edges of the transfer section.

5. The method according to claim 4, wherein the portions of the transfer layer include first and second side zones of the transfer layer that respectively extend along the first and second side edges of the transfer section.

6. The method according to claim 4, wherein fracturing the transfer layer along an edge of the transfer section comprises fracturing the transfer layer along the trailing edge of the transfer section.

7. The method according to claim 1, wherein selectively removing portions of the transfer layer comprises selectively removing aligned discrete portions of the transfer layer to create at least one perforation line in the transfer layer.

8. The method according to claim 7, wherein each discrete portion comprises a dot or a dash.

9. The method according to claim 8, wherein transferring the transfer section from the carrier layer to a surface of a substrate comprises fracturing the transfer layer along one of the perforation lines.

10. The method according to claim 7, wherein:
the substrate includes a leading edge, a trailing edge opposite the leading edge, and first and second opposing side edges extending between the leading and trailing edges; and
the transfer section includes a leading edge corresponding to the leading edge of the substrate, a trailing edge corresponding to the trailing edge of the substrate and side edges corresponding to the side edges of the substrate; and
at least one perforation line is an edge line that adjoins one of the edges of the transfer section.

11. The method according to claim 10, wherein the edge line is aligned with one of the trailing edge, the leading edge or one of the side edges of the substrate.

12. The method according to claim 1, wherein selectively removing portions of the transfer layer comprises selectively removing a line of the transfer layer.

13. The method according to claim 12, wherein:
the method comprises feeding the transfer layer and carrier layer in a feed direction during selectively removing portions of the transfer layer; and
the line is oriented at an angle of less than 45 degrees to the feed direction.

14. The method according to claim 1, wherein selectively removing portions of the transfer layer from the carrier layer comprises selectively removing a pattern of the transfer layer.

15. The method according to claim 14, wherein the pattern is selected from the group consisting of a perforated line, a cross-hatched pattern, a fishbone pattern, and a dot pattern.

16. The method according claim 15, wherein the pattern comprises a cross-hatched pattern having a plurality of lines, which are oriented at angles of less than 45 degrees to a feed direction in which the transfer layer and the carrier layer are fed during selectively removing portions of the transfer layer.

17. The method according to claim 1, wherein selectively removing portions of the transfer layer from the carrier layer comprises selectively removing portions of the transfer layer that are within the transfer section.

18. A method of laminating a transfer layer to a substrate comprising:
provided a transfer layer on a carrier layer;
selectively removing at least one perforated line of the transfer layer from the carrier layer using an adhesive panel comprising:
heating portions of the adhesive panel corresponding to discrete portions of the transfer layer that form the perforated line; and
transferring the discrete portions of the transfer layer from the carrier layer to the adhesive panel; and
transferring a transfer section of the transfer layer from the carrier layer to a surface of a substrate comprising fracturing the transfer layer along at least one of the perforated lines.

19. The method according to claim 18, wherein:
the substrate includes a leading edge, a trailing edge opposite the leading edge, and first and second opposing side edges extending between the leading and trailing edges; and
the transfer section includes a leading edge corresponding to the leading edge of the substrate, a trailing edge corresponding to the trailing edge of the substrate and side edges corresponding to the side edges of the substrate; and
one of the perforated lines extends along one of the edges of the transfer section.

20. The method according to claim 19, wherein one of the perforated lines extends along the trailing edge of the transfer section.

\* \* \* \* \*